United States Patent
Pantone et al.

(10) Patent No.: US 6,355,721 B1
(45) Date of Patent: Mar. 12, 2002

(54) HIGH MOLECULAR WEIGHT LIQUID, NON-FUNCTIONAL POLYETHER POLYURETHANE PLASTICIZERS

(75) Inventors: Richard S. Pantone, New Martinsville, WV (US); Peter H. Markusch, McMurray, PA (US)

(73) Assignee: Bayer Coporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,677

(22) Filed: Dec. 3, 1999

(51) Int. Cl.$^7$ .............................. C08J 3/00; C08K 3/20; C08K 5/16; C08L 75/00; C08G 18/00

(52) U.S. Cl. ...................... 524/590; 524/198; 524/199; 524/589; 528/44; 528/69

(58) Field of Search ................................. 524/589, 590, 524/198, 199; 528/44, 69

(56) References Cited

U.S. PATENT DOCUMENTS

| | | | |
|---|---|---|---|
| 4,123,413 A | 10/1978 | Mark et al. | 260/32.6 NR |
| 4,482,408 A | 11/1984 | Stephens et al. | 149/19.4 |
| 4,824,888 A | 4/1989 | Emmerling et al. | 524/199 |
| 5,525,654 A | 6/1996 | Podola et al. | 524/199 |
| 6,218,462 B1 * | 4/2001 | Pantone et al. | 524/590 |

FOREIGN PATENT DOCUMENTS

EP 928 824 7/1999

OTHER PUBLICATIONS

Database WPI, Section Ch, Week 198712, Derwent Publications Ltd., London, GB; Class A25, AN 1987–083477, XP002160816, & JP 62 034932 A (Sanyo Chem Ind Ltd), Feb. 14, 1987 Abstract.

* cited by examiner

Primary Examiner—Patrick D. Niland
(74) Attorney, Agent, or Firm—Joseph C. Gil; N. Denise Brown

(57) ABSTRACT

This invention relates to high molecular weight liquid, non-migrating, non-functional polyether polyurethane plasticizers. These plasticizers comprise the reaction product of an isocyanate-terminated polyether prepolymer having an NCO group content of less than 13% and a monofunctional alcohol having a molecular weight of about 32 to about 1,000 and an OH number of about 56 to about 1750. The isocyanate-terminated polyether prepolymers comprise the reaction product of a diisocyanate and at least one polyether polyol. The present invention also relates to a process for the production of the liquid, non-migrating, non-functional polyether polyurethane plasticizers. This invention also relates to a process for the production of a polyurethane product comprising reacting at least one polyisocyanate component with at least one isocyanate-reactive component, in the presence of these high molecular weight liquid, non-migrating, non-functional polyether polyurethane plasticizers, and to the resultant polyurethane products of this process.

37 Claims, No Drawings

HIGH MOLECULAR WEIGHT LIQUID, NON-FUNCTIONAL POLYETHER POLYURETHANE PLASTICIZERS

BACKGROUND OF THE INVENTION

This invention relates to high molecular weight liquid, non-functional polyether polyurethane plasticizers. It is also directed to a process for the production of these plasticizers, a process for the production of a polyurethane comprising the reaction between an isocyanate component and an isocyanate-reactive component in the presence of these plasticizers, and to the polyurethanes produced by that process.

Plasticizers are generally used in plastics (i.e., PVC) to adjust hardness, flexibility and processing characteristics. Plasticizers are also used in commercial polyurethane elastomer formulations to provide products exhibiting higher flexibility, lower hardness, and lower rebound resulting in increased energy absorption. However, these products can potentially embrittle over time due to migration of the plasticizer. Plasticizers that have a minimal effect on hardness and physical properties, and which are non-migrating are desirable for polyurethane elastomers prepared by a one-shot cast elastomer process.

Diurethanes are known and described as suitable stabilizing additives for sealing compounds in, for example, U.S. Pat. No. 4,824,888 and as plasticizers for polyurethane based sealing and adhesive compositions in U.S. Pat. No. 5,525,654.

U.S. Pat. No. 4,824,888 discloses diurethanes which correspond to one of two general formulas, which are useful as stabilizing additives in sealing compounds based on isocyanate-terminated prepolymers of difunctional and trifunctional polyether or polyester polyols and/or polyvinylchloride swellable copolymers of vinyl chloride with monomers from the group vinyl acetate, vinyl propionate, alkyl acrylates. These diurethanes are reaction products of monofunctional alcohols and diisocyanates. In particular, the monoalcohols are monofunctional polypropylene glycol monoalkyl ethers having a molecular weight of about 500 to 2000. These diurethanes are also suitable stabilizing agents for isocyanate-terminated polyurethane prepolymers, and for polyvinyl chloride homopolymer or copolymer plastisols.

Moisture curing sealing and/or adhesive compositions based on alkoxysilane-terminated polyurethanes which contain diurethanes as plasticizers are described by U.S. Pat. No. 5,525,654. These diurethanes are prepared from either diol mixtures and monofunctional isocyanates wherein substantially all the free hydroxyl groups are reacted, or from diisocyanates and monofunctional alcohols wherein substantially all the free isocyanate groups are reacted.

Other urethane plasticizers are disclosed in, for example, U.S. Pat. Nos. 4,123,413 and 4,482,408. The urethane plasticizers of U.S. Pat. No. 4,123,413 correspond to one of three general formulas, and are prepared by reaction of an alcohol or a phenol with an isocyanate, from amines and chloroformates, or from chloroformamides and alcohols or phenols in the presence of acid binding agents.

The urethane plasticizer of U.S. Pat. No. 4,482,408 is octyldecyl-butyl urethane and is prepared by reacting an equimolar mixture of octyldecyl isocyanate and n-butyl alcohol. This urethane plasticizer is a mono-urethane described as a straight-chain, saturated, carbamic acid ester and is suitable as a plasticizer for propellant compositions with problems of plasticizer migration which typically occur during propellant storage.

Useful polyurethane plasticizers according to the present invention are based on high molecular weight polyether diisocyanate prepolymers reacted with monoalcohols or mixtures of monoalcohols. They are prepared by either adding the alcohols to the prepolymer or by addition of the prepolymer to the monofunctional alcohol(s). The polyurethane plasticizers are liquid at 25° C. and usually exhibit low viscosity. The resulting polyurethanes do not contain any free hydroxyl- or isocyanate-groups, and thus they are non-reactive and can be added to either isocyanates or polyols to form stable mixtures.

The use of these polyurethane plasticizers in one-shot polyurethane elastomers has several important benefits:
1) Addition to either the polyol or the isocyanate composition allows one to adjust the mix ratio very favorably, i.e., to adjust a 1:1.5 ratio to an easier to process ratio of 1:1.
2) Addition to either the polyol or the isocyanate compositions allows one to adjust the viscosities of the two components very favorably, i.e., to obtain viscosities which are similar which facilitates the mixing process.
3) Unmodified polyisocyanates that contain no urethane, allophanate, urea, or biuret groups are usually very incompatible with polyol compositions due to major differences in surface energy (i.e., polarity). Addition of the diurethane containing plasticizers according to the invention to either the polyisocyanate or both the polyisocyanate and polyol side of one-shot elastomer formulations helps to overcome these incompatibility problems and thus facilitates mixing.

Although it is possible in one-shot elastomer formulations to meter the single components separately and mix them, i.e., in a reactor or mixhead, it is preferred to combine the polyurethane containing plasticizer with the polyisocyanate and/or the polyol/chain extender blend prior to mixing the isocyanate containing the isocyanate reactive polyol components.

Besides the processing advantages polyurethane plasticizers provided in one-shot polyurethane elastomer formulations, they do not show any substantial migration or lower the physical properties of the final polyurethane elastomer upon aging to the extent observed in state of the art non-urethane group containing plasticizers. As a result, the high performance properties of one-shot polyurethane elastomers upon aging are effected minorly when polyurethane containing plasticizers are used in the formulation.

SUMMARY OF THE INVENTION

This invention relates to high molecular weight liquid, non-migrating, non-functional, polyurethane plasticizers having a viscosity of less than about 50,000 mPa·s at 25° C. These plasticizers comprise the reaction product of (1) an isocyanate-terminated polyether prepolymer having an NCO group content of less than 13%, and (2) a monofunctional alcohol having a molecular weight of about 32 to about 1,000, preferably of about 128 to about 720, and an OH number of about 56 to about 1750, preferably of about 78 to about 438.

As used herein, the phrase high molecular weight liquid, non-migrating, non-functional polyether polyurethane plasticizers having a viscosity of less than about 50,000 mPa·s at 25° C. refers to adducts having molecular weights in the range of from about 3,000 to about 6,500. It is preferred that these plasticizers have a ratio of carbon atoms to oxygen atoms of less than 5:1.

Suitable (1) isocyanate-terminated polyether prepolymers comprise the reaction product of (a) a diisocyanate component having an NCO group content of about 32.0 to about 60.0%, preferably of about 33.6%, and a functionality of about 2.0; with (b) at least one polyether polyol having a molecular weight of about 1,000 to less than about 5,000, preferably of about 2,000 to about 4,000, an OH number of about 23 to about 168 and a functionality of from about 2 to about 3. The amounts of (1)(a) diisocyanate and (1)(b) polyether polyol are such that the NCO:OH equivalent ratio in the prepolymer is from about 2:1 to about 7:1, and preferably from about 3:1 to about 5:1.

This invention also relates to a process for the production of these high molecular weight liquid, non-migrating, non-functional polyether polyurethane plasticizers that are characterized by a viscosity of less than about 50,000 mPa·s at 25° C., and preferably a carbon to oxygen ratio of less than 5:1. This process comprises:

(1) reacting
   (a) a diisocyanate component having an NCO group content of about 32.0 to about 60.0%, and a functionality of about 2.0, with
   (b) at least one polyether polyol having a molecular weight of about 1,000 to less than about 5,000, an OH number of about 23 to about 168, and a functionality of from about 2 to about 3,
   at an NCO:OH equivalent ratio of from about 2:1 to about 7:1, preferably from about 3:1 to about 5:1, to form an isocyanate-terminated polyether prepolymer having an NCO group content of less than about 13%; preferably having an NCO group content of about 3 to about 10%, and (2) reacting the isocyanate-terminated polyether prepolymer formed in (1) above, with
   (c) a monofunctional alcohol having a molecular weight of about 32 to about 1,000, preferably of about 128 to about 720, and an OH number of about 56 to about 1750, preferably of about 78 to about 438.

This present invention also relates to a process for the production of a polyurethane, comprising reacting a polyisocyanate component with an isocyanate-reactive component in the presence of these high molecular weight liquid, non-migrating, non-functional polyether polyurethane plasticizers, as well as to the polyurethanes produced by this process.

DETAILED DESCRIPTION OF THE INVENTION

In accordance with the present invention, the high molecular weight liquid, non-migrating, non-functional polyether polyurethane plasticizers are characterized by a viscosity of less than about 50,000 mPa·s, preferably less than about 30,000 mPa·s, at 25° C., and preferably has a carbon to oxygen ratio of less than 5:1. Suitable high-molecular weight, liquid, non-migrating, non-functional polyether polyurethane plasticizers for the present invention comprise the reaction product of (1) an isocyanate-terminated polyether prepolymer having an NCO group content of less than about 13%, preferably having an NCO group content of about 3 to about 10%, and (2) a monofunctional alcohol having a molecular weight of about 32 to about 1,000, preferably of about 128 to about 720, and an OH number of about 56 to about 1750, preferably of about 78 to about 438.

The high molecular weight, liquid, non-migrating, non-functional, polyether polyurethane plasticizers of the present invention can be prepared by, for example, the so-called "standard method" of addition. In this method, the isocyanate-terminated polyether prepolymer of the desired NCO group content is formed in a first step by the reaction of the diisocyanate component with at least one polyether polyol, in the relative ratios as described above. Then, the monoalcohol component is added to the isocyanate-terminated polyether prepolymer in a second step, thereby forming the high molecular weight liquid, non-migrating non-functional polyether polyurethane plasticizer which has a viscosity of less than about 50,000 cps at 25° C.

Suitable isocyanate-terminated polyether prepolymers to be used as component (1) are those isocyanate-terminated polyether prepolymers which comprise the reaction product of (a) a diisocyanate component having an NCO group content of about 32.0 to about 60.0, and a functionality of about 2.0; and (b) at least one polyether polyol having a molecular weight of about 1,000 to less than about 5,000, and OH number of about 23 to about 168 and a functionality of from about 2 to about 3. The diisocyanate component and the polyether polyol are present in amounts such that the NCO:OH equivalent ratio is from about 2:1 to about 7:1, preferably from about 3:1 to about 5:1.

Suitable diisocyanates for forming the isocyanate-terminated polyether prepolymers of the present invention include those having an NCO group content of about 25.0 to about 60.0%, preferably about 32.0–50.0%, and a functionality of about 2.0. Mixtures of these diisocyanates are also suitable for the present invention. It is possible to use diisocyanates that are either symmetrical or asymmetrical diisocyanates in forming the isocyanate-terminated polyether prepolymers of the present invention. Asymmetrical diisocyanates are preferred because these usually result in polyurethane containing plasticizers with lower viscosity.

As used herein, the phrase "asymmetrical diisocyanate" means a diisocyanate which does not have an axis of symmetry, i.e., it can not be divided by a line into two equal parts that are mirror images. Suitable diisocyanates have to contain a minimum of 20% asymmetrical diisocyanates, with the rest being symmetrical diisocyanates, to be considered asymmetrical as used herein.

Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent araliphatic hydrocarbon group having 7 to 20 carbon atoms, or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocanatomethyl cyclopentane, 1-isocyanato-3-isocyanatemethyl-3,5,5-trimethyl-cyclohexane (isophorone diisocyanate or IPDI), bis(4-isocyanatocyclohexyl)methane, 2,4'- and/or 4,4'-dicyclohexylmethane diisocyanate, 1,3- and 1,4-bis(isocyanatomethyl)cyclohexane, bis(4-isocyanato-3-methyl-cyclohexyl)methane, α,α,α',α'-tetramethyl-1,3- and/or -1,4-xylylene diisocyanate, 1-isocyanato-1-methyl-4

(3)-isocyanatomethyl cyclohexane, 2,4- and/or 2,6-hexahydrotoluene diisocyanate, 1,3- and/or 1,4-phenylene diisocyanate, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof.

It is preferred that the diisocyanates of the present invention are asymmetrical diisocyanates.

Some examples of suitable asymmetrical diisocyanates to be used in the present invention include diisocyanates such as isomeric mixtures of 2,4'-diphenylmethane diisocyanate and 4,4'-diphenylmethane diisocyanate, isomeric mixtures of 2,4'-dicyclohexylmethane and 4,4'-dicyclohexylmethane diisocyanate, isophorone diisocyanates, and isomeric mixtures of 2,4-toluene diisocyanate and 2,6-toluene diisocyanate.

A particularly preferred asymmetrical diisocyanate component comprises an isomeric mixture of diphenylmethane diisocyanate containing at least about 20% (preferably from 40 to 70%) by weight of the 2,4'-isomer, less than about 80% (preferably about 30–60%) by weight of the 4,4'-isomer, and about 0 to about 5% (preferably less than about 2%) by weight of the 2,2'-isomer.

Suitable polyether polyols to be used in forming the isocyanate prepolymers of the present invention include those having a molecular weight of about 1,000 to less than about 5,000, preferably about 2,000 to about 4,000, an OH number of about 23 to about 168, and a functionality of about 2 to about 3. The polyether polyols suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively, to components containing reactive hydrogen atoms such as water, alcohols or amines. Examples of suitable alcohols and amines include, for example, compounds such as propylene glycol, glycerin, ethylene glycol, diethylene glycol, trimethylol-propane, triethanolamine, water, trimethylolpropane, bisphenol A, aniline, ammonia, ethanolamine, etc.

Suitable monoalcohols to be reacted with the isocyanate-terminated polyether prepolymers for the preparation of the high molecular weight liquid, non-functional polyurethane group containing plasticizers of the present invention include those having a molecular weight of about 32 to about 1,000, preferably of about 128 to about 720, and an OH number of about 56 to about 1750, preferably of about 78 to about 438. Some examples of suitable monoalcohols include compounds such as linear alkyl alcohols, branched alkyl alcohols, alkoxylated products of alkyl alcohols and alkyl ester alcohols.

Some examples of suitable monoalcohols include compounds such as 1-hexanol, 1-heptanol, 1-octanol, 1-nonanol, 1-decanol, 1-dodecanol, 2-ethyl-1-hexanol, 3,5,5-trimethyl-1-hexanol, 2-ethyl-1-heptanol, 2-ethyl-1-octanol, linear and branched $C_9$ to $C_{19}$ alcohols and mixtures thereof; alkoxylation products containing from 1 to 15 carbon atoms, from 3 to 12 alkoxy groups and containing 1 hydroxyl group, such as, for example, ethoxylation and/or propoxylation adducts of linear primary alcohols containing from 12 to 15 carbon atoms such as, for example, 1-dodecanol, 1-tridecanol, 1-tetradecanol, 1-pentadecanol and mixtures thereof; alkyl esters alcohols such as, 2,2,4-trimethyl-1,3-pentanediol monoisobutyrate. Also, mixtures of alkoxylation adducts of an alkylene oxide and a monoalcohol compound containing from 1 to 15 carbon atoms with a monoalcohol compound having a molecular weight of 100 to 1,000 and from 5 to 19 carbon atoms are suitable for component (2) of the present invention.

The plasticizers of the present invention are prepared by a two-step process. First the isocyanate-terminated polyether prepolymers are prepared, via any of the known methods of preparing isocyanate-terminated prepolymers, by (1) reacting (a) a diisocyanate component having an NCO group content of about 32.0 to about 60.0%, and a functionality of about 2.0, with (b) at least one polyether polyol having a molecular weight of about 1,000 to less than about 5,000, an OH number of about 23 to about 168 and a functionality of from about 2 to about 3. The diisocyanate and polyether polyol are present in amounts such that the NCO:OH equivalent ratio is from about 2:1 to about 7:1, preferably about from about 3:1 to 5:1, thereby forming an isocyanate-terminated prepolymer having an NCO group content of less than about 13%, preferably less than about 10%.

The second step in the process of preparing the liquid, polyurethane group containing plasticizers of the present invention comprises (2) reacting these isocyanate-terminated polyether prepolymers, with (c) a monofunctional alcohol having a molecular weight of about 32 to about 1,000, preferably of about 128 to about 720, and an OH number of about 56 to about 1750, preferably of about 78 to about 438.

Suitable polyisocyanates which may be used in the process of producing a polyurethane comprising reacting a polyisocyanate with an isocyanate-reactive component in the presence of the plasticizers described above in accordance with the present invention include, for example, monomeric diisocyanates, NCO prepolymers, and preferably liquid polyisocyanates and polyisocyanate adducts. Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisodyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl) methane, 2,4'-dicyclohexylmethane diisocyanate, 1,3- and 1,4-bis(isocyanatomethyl) cyclohexane, bis(4-isocyanato-3-methylcyclohexyl) methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly (phenylisocyanates) obtained by phosgenating aniline/formaldehyde condensates may also be used.

In accordance with the present invention, at least a portion of the polyisocyanate component may be present in the form of an NCO prepolymer or a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2.0 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. Nos. 4,288,586 and 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a, i.e., trialkyl phosphine catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.0 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 29% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

Preferred polyisocyanate adducts are the polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 300 to about 5,000, preferably 400 to about 3,000, and optionally low molecular weight compounds with molecular weights below 300. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates of the present invention are aromatic polyisocyanates. Some examples of suitable aromatic polyisocyanates are 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof.

Among the polyisocyanates suitable for the presently claimed invention are polymethylene poly (phenylisocyanate) compositions having a functionality of from about 2.1 to about 3.5, preferably 2.2 to 3.2 and most preferably of 2.3 to 2.8, and an NCO group content of about 26% to about 33.4%, preferably about 30.5% to about 33%, and a monomeric diisocyanate content of from about 20% to about 90% by weight, preferably from about 40% to about 80%, wherein the content of monomeric diisocyanate comprises up to about 5% by weight of the 2,2'-isomer, from about 1 to about 25% by weight of the 2,4'-isomer, and from about 25 to about 70% by weight of the 4,4'-isomer, based on the entire weight of the isocyanate composition. The polymeric MDI content of these isocyanates varies from about 10 to about 80% by weight, preferably from about 20% to about 60% by weight.

"Polymeric MDI" as used herein, refers to polymethylene poly(phenyl-isocyanate) which in addition to monomeric diisocyanate (i.e., two-ring compounds) contains three-ring and higher ring containing products.

Also suitable are mixtures of polyisocyanate compositions as described above with adducts of MDI including, for example, allophanates of MDI as described in, for example, U.S. Pat. Nos. 5,319,053, 5,319,054, and 5,440,003, the disclosures of which are herein incorporated by reference; urethanes of MDI as described in, for example, U.S. Pat. Nos. 5,462,766 and 5,555,897, the disclosures of which are herein incorporated by reference; and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Isocyanate prepolymers used in the process of producing a polyurethane comprising reacting a polyisocyanate with an isocyanate-reactive component in the presence of the plasticizers described hereinabove include, for example, those based on diphenylmethane diisocyanate which may be based on either polyethers or polyesters are suitable for the present invention. These compounds include, for example, an isocyanate-terminated prepolymer having an NCO content of about 4–23%, and a functionality of about 2. Such prepolymers can be prepared by, for example, reacting 2,4'-isomer rich MDI with a difunctional polyether (prepared from propylene glycol and propylene oxide).

Other suitable isocyanates include, for example, cycloaliphatic diisocyanates which are asymmetric. Suitable cycloaliphatic diisocyanates include compounds such as, for example, 4,4'-dicyclo-hexylmethane diisocyanate and isophorone diisocyanate, and mixtures thereof.

Suitable isocyanate-reactive components to be used in the process of producing a polyurethane comprising reacting a polyisocyanate with an isocyanate-reactive component in the presence of the plasticizers described hereinabove include, for example, compounds containing at least one of the groups selected from the group consisting of hydroxy groups and amine groups, and having an average functionality of from 1 to 4, preferably from about 2 to 3, and a molecular weight of about 500 to 10,000, preferably from about 1,000 to 8,000. Examples of suitable types of compounds to be used include the polyethers, polyesters, polythioethers, polyacetals, polycarbonates, and amine terminated polyethers containing from 1 to 4 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. The polyethers could contain substantial amounts of primary hydroxyl groups in terminal positions (greater than 80% by weight, based on all of the terminal hydroxyl groups present in the polyether).

Polyether polyols are preferably used as the isocyanate-reactive component in the present process of producing a polyurethane with a plasticizer as described herein. Preferred polyethers include, for example, those compounds based on di- or tri-functional starters such as, for example, water, ethylene glycol, propylene glycol, glycerin, trimethylol-propane, or triethanolamine. These preferred compounds include copolymers of ethylene oxide and propylene oxide with not more than 15% by weight of the oxides being ethylene oxides.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume I, 1964, pages 5–6 and 198–199; and in Kunststoff-Handbuch, Vol. VII, Vieweg-Hochtlen, Carl Hanser Verlag, Munich, 1966, pages 45–71.

Also suitable are so-called amine terminated polyethers containing primary or secondary, aromatically or aliphatically bound amino groups, wherein amino end groups can also be attached to the polyether chain through urethane or ester groups. These amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end, groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501, 873, 4,515,923, 4,525,534, 4,540,720, 4,578,500 and 4,565, 645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,532,317, 4,723,032, 4,724,252, 4,855,504 and 4,931,595, the disclosures of which are herein incorporated by reference. The amine terminated polyethers used in the present invention are in many cases mixtures with any of the above-mentioned compounds.

In another embodiment, the isocyanate-reactive component used to produce a polyurethane product may be a polyhydroxyl compound which comprises: i) a dispersion of a polyurea and/or polyhydrazo-dicarbonamide in a relatively high molecular weight organic compound containing at least two hydroxyl groups, ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Union Carbide.

The preferred PHD polyols include, for example, the polyurea of toluene diisocyanate and hydrazine dispersed in polyether polyol, and the preferred polymer polyols include, for example, those based on the monomers styrene and acrylonitrile.

In addition, the isocyanate-reactive component used in the process to produce polyurethane products that contain polyurethane plasticizers, typically contains at least one chain extender and/or crosslinking agent that may contain hydroxyl groups, amine groups, or both, which is used in combination with the relatively high molecular weight, isocyanate-reactive components described above. Suitable relatively low molecular weight compounds generally have molecular weights of from about 60 to less than 500, and contain from 1 to 4, preferably from 2 to 3 isocyanate-reactive groups.

Suitable chain extenders and/or crosslinking agents according to the invention include, for example, diols and triols such as, for example, 2-methyl-1,3-propanediol, ethylene glycol, 1,2- and 1,3-propanediol, 1,3- and 1,4- and 2,3-butane-diol, 1,6-hexanediol, 1,10-decanediol, diethylene glycol, triethylene glycol, tetraethylene glycol, dipropylene glycol, tripropylene glycol, neopentyl glycol, pentaerythritol, cyclohexane-dimethanol, 2,2,4-trimethylpentane-1,3- diol, trimethylolpropane, glycerol, 1,4-ethoxy(β-hydroxybenzene), and mixtures thereof. Preferred diols include, for example, 1,4-butanediol, ethylene glycol, diethylene glycol, trimethylolpropane, 1,4-ethoxy(β-hydroxybenzene), and mixtures thereof.

Suitable aminoalcohols to be used as crosslinking agents include, for example, diethanolamine, triethanolamine, diisopropanolamine, monoisopropanolamine, monoethanolamine, etc.

Suitable amine compounds to be used as crosslinking agents in accordance with the invention include organic primary amines and secondary amines such as, for example, 2-methyl-1,5-pentane diamine, ethylene diamine, 1,3-diamino-propane, 1,3-diaminobutane, 1,4-diamino-butane, isophorone-diamine, diamino-cyclohexane, hexamethylene-diamine, methyliminobis-(propyl-amine), iminobis(propyl-amine), bis(aminopropyl)piperazine, aminoethyl piperazine, bis-(p-aminocyclohexyl)-methane, mixtures thereof, and the like.

Other suitable amines include, for example, 1,8-p-diamino-methane, bis(4-amino-3-methylcyclohexyl)methane, bis(4-amino-3,5-dimethylcyclohexyl)methane, bis(4-amino-2,3,5-trimethylcyclohexyl)methane, 1,1-bis(4-aminocyclohexyl)propane, 2,2-(bis(4-aminocyclohexyl)propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

It is also possible to use the so-called amine-terminated polyethers having low molecular weights. Among the suitable amine terminated polyethers include, for example, those containing primary or secondary, aromatically or aliphatically bound amino groups, wherein amino end groups can also be attached to the polyether chain through urethane or ester groups. Suitable compounds include, for example, Jeffamine D-400 and Jeffamine D-230, which are commercially available from Huntsman Chemical Corporation.

These low molecular weight amine-terminated polyethers can be prepared by any of several methods known in the art. For example, amine-terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, or chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amine end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. The preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504 and 4,931,595, the disclosures of which are herein incorporated by reference.

The amine terminated polyethers used in the present invention are in many cases mixtures with any of the above-mentioned compounds.

Other suitable amines to be used for crosslinking agents in the present invention include, for example, aromatic diamines such as, for example, 1-methyl-3,5-diethyl-2,4-diamino benzene (i.e., DETDA), 1-methyl-3,5-diethyl-2,6-diamino benzene (i.e., DETDA), 1,3,5-trimethyl-2,4-diamino benzene, 1,3,5-triethyl-2,4-diamino benzene, 3,5, 3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenyl-methane, 3,3'-diethyl-5,5'-diisopropyl-4,4'-diamino diphenyl-methane, 1-methyl-2,6-diamino-3-isopropylbenzene, 1-methyl-3,5-dithioethyl-2,4-diamino benzene and/or 1-methyl-3,5-dithioethyl-2,6 diamino benzene (ETHACURE 300), and mixtures of the above diamines, such as, for example, mixtures of 1-methyl-3,5-diethyl-2,4-diamino benzene and 1-methyl-3,5-diethyl-2,6-diamino benzene.

Preferred compounds containing amine groups to be used in the present invention as crosslinking agents include monoethanolamine, DETDA, and ETHACURE 300.

It is also possible that the low-molecular weight crosslinking agents include at least one organic crosslinker such as, for example, organic polyols and/or organic amines containing greater than 2 isocyanate-reactive groups, preferably 3 to 8 isocyanate-reactive groups, and most preferably 3 isocyanate-reactive groups. Examples of such compounds include, for example, diethanolamine, triethanolamine, trimethylolpropane, glycerol, diisopropanolamine, mixtures thereof, and the like. Alkoxylated polyols of the above mentioned starter compounds are also suitable crosslinkers.

The polyurethanes produced by reacting a polyisocyanate component and an isocyanate-reactive component in the presence of the high molecular weight liquid, non-functional polyether polyurethane plasticizers are easy to process due to the fact that the polyurethane plasticizer can be added to the polyisocyanate, or it can be added to the isocyanate-reactive component. It can also be added as a separate addition stream. These plasticizers exhibit less migration from the resultant polyurethane elastomer products than conventional plasticizers (i.e., octyl phthalate) do. The presence of the plasticizers of the present invention retains the elastomer properties upon aging vs. standard plasticizers such as dioctyl phthalate, which tend to lose elastomer properties upon aging.

The preparation of the polyurethane elastomer described in the present invention can involve the three separate addition stream reaction of an organic polyisocyanate component, with an isocyanate-reactive component, and a non-reactive liquid polyurethane plasticizer. The process may also be a four separate addition stream reaction, when the isocyanate-reactive component comprises two separate addition streams, one being a relatively high molecular weight isocyanate-reactive component, and the other being a lower molecular weight isocyanate-reactive component such as, for example, a crosslinking agent and/or a chain extender.

Preferably, the liquid, polyurethane group containing plasticizer is premixed with the polyisocyanate component, and/or with the isocyanate-reactive component. In embodiments in which the isocyanate-reactive component is added as two separate reactants wherein one is a high molecular weight component, and one is a low molecular weight component, the plasticizer component may be added to either or both of the isocyanate-reactive components in the process scheme.

The one-shot polyurethane elastomer of this invention contains from 5 to 90% by weight, preferably 10–50% by weight, of the liquid polyurethane plasticizer. The NCO:OH equivalent ratio of the organic polyisocyanate to the total of isocyanate-reactive groups in the isocyanate-reactive component (whether present as one component or two components) is from about 0.90:1 to about 1.10:1, preferably about 1.01:1 to about 1.05:1.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used to prepare plasticizers:

| | |
|---|---|
| Isocyanate A: | an isomeric mixture of diphenylmethane diisocyanate having an NCO group content of about 33.6% and containing about 55% by weight of the 2,4'-isomer and about 45% by weight of the 4,4'-isomer |
| Isocyanate B: | 4,4'-diphenylmethane diisocyanate having an NCO group content of about 33.6% |
| Polyether A: | a propylene glycol started propylene oxide/ethylene oxide (wt. ratio of 80:20) polyether polyol having an OH number of about 28 |
| Polyether B: | a propylene glycol started propylene oxide polyether polyol having an OH number of about 56 |
| Alcohol A: | a saturated branched chain isostearyl ($C_{18}$) fatty alcohol, having an OH number of 193, a molecular weight of about 291 and a water content of about 0.04% by weight; commercially available as Emery H-3060 from Henkel Corp. |
| Alcohol B: | 2,2,4-trimethyl-1,3-pentanediol monoisobutyrate having a molecular weight of about 216 and a freezing point of about −50° C.; commercially available as Texanol Ester Alcohol from Eastman Chemical |
| Alcohol C: | a 3 mole ethoxylate of $C_{12}$ and $C_{13}$ linear primary alcohols having an OH number of about 177, a molecular weight of about 317, a water content of about 0.01% and an EO:OH ratio of about 2.79:1; commercially available as Neodol 23-3 from Shell Chemical Company |
| Alcohol D: | 2-ethyl-1-hexanol having a molecular weight of 128 |
| Alcohol E: | a 12 mole ethoxylate of $C_{12}$–$C_{15}$ linear primary alcohols having an OH number of about 78, a molecular weight of about 719, a water content of about 0.01 % and an EO:OH ratio of about 11.7:1; commercially available as Neodol 25-12 from Shell Chemical Company |

The high molecular weight liquid, non-migrating, non-functional, polyether polyurethane plasticizers can be prepared using a two-step process in a reactor equipped with a stirrer and a thermocouple to read reaction temperatures. The reaction was conducted under a dry nitrogen blanket. In the first step, the diisocyanate component was charged to the reactor and heated under agitation to 50° C. Subsequently, the polyether polyol, which was preheated to 50–80° C., was added. Next, the material was heated to 80° C. and maintained at that temperature for 3 to 5 hours. The % NCO of the resultant isocyanate terminated polyether prepolymer was determined. The results are set forth in Table 1.

In the second step, the isocyanate-terminated polyether prepolymer from Table 1 was then cooled to about 50° C. The amount of alcohol necessary to completely react with the isocyanate-terminated polyether prepolymer (NCO:OH = 1:1) was determined for each example. This amount of alcohol (at room temperature, except for Example 5 which was heated to 50° C. to liquefy the alcohol) was added to the isocyanate-terminated polyether prepolymer as quickly as possible while maintaining the reaction temperature between 50 and 80° C. Cooling was applied to the flask as necessary to maintain the temperature between 50 and 80° C. Then, the reaction mixture was heated to 80° C. and maintained at that temperature for about 3 to 5 hours, until all the isocyanate was reacted. This was determined by using isocyanate indicator paper. The results are shown in Table 2.

TABLE 2

Polyether Polyurethane Plasticizers

| Example | Iso (Table 1) | Polyether (Table 1) | Alcohol | Prepolymer (Table 1) | % by Wt. Iso/Polyether Prepolymer (Table 1) | % by Wt. Alcohol | NCO:OH ratio (Prepolymer/Alcohol) | Appearance at 25° C. | Viscosity mPa · s at 25° C. |
|---|---|---|---|---|---|---|---|---|---|
| 1 | A | A | A | Prepolymer 1 | 69.30% | 30.70 | 1:1 | Liquid | 14,350 |
| 2 | A | A | B | Prepolymer 2 | 72.21% | 24.79 | 1:1 | Liquid | 12,780 |
| 3 | A | A | C | Prepolymer 3 | 67.43% | 32.57 | 1:1 | Liquid | 13,590 |
| 4 | A | A | D | Prepolymer 4 | 83.67% | 16.33 | 1:1 | Liquid | 24,180 |
| 5 | A | A | E | Prepolymer 5 | 47.71% | 52.29 | 1:1 | Liquid | 6,000 |
| 6 | A | B | C | Prepolymer 6 | 56.17% | 43.83 | 1:1 | Liquid | 12,220 |
| 7 | B | A | C | Prepolymer 7 | 67.43% | 32.57 | 1:1 | Liquid | 18,720 |

The preparation of polyurethane elastomers containing high molecular weight liquid, non-functional polyether polyurethane plasticizers:

The following components were used in the preparation of the polyurethane elastomers:

| | |
|---|---|
| Polyether C: | a glycerin initiated polyoxypropylene oxide/polyethylene oxide polyether polyol having an OH number of about 28 and a functionality of 3 |
| Diol A: | 1,4-butanediol |
| Catalyst A: | dibutyltin dilaurate |
| Isocyanate C: | a modified diphenylmethane diisocyanate terminated polyether prepolymer based on polypropylene ether glycol (PPG) and having an NCO group content of about 21.7% |

The polyurethane elastomers in Table 3 were prepared using a hand cast procedure. The formulation for these elastomers was as follows:

| | |
|---|---|
| Polyether C: | 172.7 parts by weight |
| Diol A: | 19.2 parts by weight |
| Plasticizer: | 74.0 parts by weight |
| Catalyst A: | 20 ppm |
| Isocyanate C: | 104.1 parts by weight |

The weight of the catalyst (dibutyltin dilaurate) in the formulation was based on the total weight of the polyol, diol, and plasticizer in the formulation.

The polyether, the diol, the plasticizer (from Table 2) and the catalyst were weighed into a suitable vessel and then degassed in a vacuum heating oven at 25–50° C. until free of bubbles. The isocyanate (pre-degassed) was then added to the vessel and stirred form 30–60 seconds. The reaction mixture was then poured into a steel mold. The elastomer was removed from the mold in ca. 15 minutes to 4 hours and placed in a 100° C. oven for 16 hours. After the elastomer was stored at 25° C. for 5 days, the elastomer properties were determined. The elastomer properties are set forth below in Table 4.

The degree of migration of the high molecular weight polyether polyurethane plasticizer described in the present invention and the non-urethane plasticizer, dioctyl phthlate, in a polyurethane elastomer formulation were determined and are shown in Table 5. An extraction method was used to determine the migration rate as an accelerated test on the plasticizer containing polyurethane elastomers. A 4"×1"×⅛" section of the polyurethane elastomer was weighed and placed in a tube of a Soxlet extractor. The elastomer was extracted with xylene for 1 hour. The sample was left overnight at room temperature, and then placed in a vacuum dissicator for 3 hours to remove any excess xylene. The dried sample was reweighed and the percent loss of plasticizer was determined.

The term non-migrating plasticizer as used herein is defined as a plasticizer which loses less than 50% by weight, based on the total weight of the plasticizer, in a polyurethane elastomer under the extraction method conditions described hereinabove.

TABLE 3

Polyurethane Elastomers Containing Polyether Polyurethane Plasticizers

| Example | Plasticizer (Table 2) | Iso (Table 1) | Polyether (Table 1) | Alcohol (Table 2) | Processing Temp., ° C. | Pot Life; Mins, Secs |
|---|---|---|---|---|---|---|
| 8 | Dioctyl Phthlate | — | — | — | 25° C. | 10' 00" |
| 9 | Example 2 | A | A | B | 50° C. | 7' 00" |
| 10 | Example 6 | A | B | C | 50° C. | 1" 15" |
| 11 | Example 7 | B | A | C | 50° C. | 1" 10" |

TABLE 4

Elastomer Properties

| Example (Table 3) | Hardness Shore A | Tensile (psi) | Elongation (%) | Elongation Set (%) | Tear Die C (pli) | Bayshore Rebound |
|---|---|---|---|---|---|---|
| Example 8 | 62 | 1,200 | 340 | 10 | 70 | 60 |
| Example 9 | 56 | 1,400 | 420 | 13 | 90 | 40 |
| Example 10[1] | — | — | — | — | — | — |
| Example 11 | 50 | 500 | 260 | 9 | 60 | 38 |

[1] Example 10 contained small bubbles - did not run elastomer properties

TABLE 5

Plasticizer Migration Properties (as determined by xylene extraction)

| Example (Table 3) | Plasticizer (Table 2) | Iso (Table 1) | Polyether (Table 1) | Alcohol (Table 2) | Plasticizer Migration, % loss by weight* |
|---|---|---|---|---|---|
| Example 8 | Dioctyl Phthlate | — | — | — | 70% |
| Example 9 | Example 2 | A | A | B | 19% |
| Example 10 | Example 6 | A | B | C | 27% |
| Example 11 | Example 7 | B | A | C | 25% |

*based on the total weight of the plasticizer

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A high molecular weight, liquid, non-migrating, non-functional polyether polyurethane plasticizer having a viscosity of less than about 50,000 mPa·s at 25° C., and comprising the reaction product of (1) an isocyanate prepolymer having an NCO group content of less than 13% which comprises the reaction product of:
  (a) a diisocyanate having an NCO group content of about 32.0 to about 60.0%, and a functionality of about 2.0; and
  (b) at least one polyether polyol having a molecular weight of about 1,000 to less than about 5,000, an OH number of about 23 to about 168 and a functionality of from about 2 to about 3;
  wherein component (1)(a) and (1)(b) are present in amounts such that the NCO:OH equivalent ratio is from about 2:1 to about 7:1; and
(2) a monofunctional alcohol having a molecular weight of about 32 to about 1,000, and an OH number of about 56 to about 1750.

2. The plasticizer of claim 1, wherein (1)(a) said diisocyanate comprises diphenylmethane diisocyanate.

3. The plasticizer of claim 2, wherein (1)(a) said diphenylmethane diisocyanate has an isomer distribution of at least about 20% by weight of the 2,4'-isomer; less than about 80% by weight of the 4,4'-isomer; and about 5% by weight or less of the 2,2'-isomer.

4. The plasticizer of claim 3, wherein said diphenylmethane diisocyanate has an isomer distribution of about 40 to about 70% by weight of the 2,4'-isomer, about 30 to about 60% by weight of the 4,4'-isomer, and about 2% by weight or less of the 2,2'-isomer.

5. The plasticizer of claim 4, wherein said diphenylmethane diisocyanate has an isomer distribution of about 50 to about 60% by weight of the 2,4'-isomer, about 40 to about 50% by weight of the 4,4'-isomer, and about 0% by weight of the 2,2'-isomer.

6. The plasticizer of claim 1, wherein (1)(a) said diisocyanate component has an NCO group content of about 32.0 to 50.0% by weight and a viscosity of less than about 1,000 mPa·s at 25° C.

7. The plasticizer of claim 1, wherein (1)(b) said polyether polyol has a molecular weight of about 2,000 to about 4,000, an OH number of about 56 to about 112, and a functionality of about 2.

8. The plasticizer of claim 7, wherein (1)(b) said polyether polyol has a molecular weight of about 3,000 to about 4,000.

9. The plasticizer of claim 1, wherein components (1)(a) said diisocyanate and (1)(b) said polyether polyol are present in amounts such that the NCO:OH equivalent ratio is from about 3:1 to about 5:1.

10. The plasticizer of claim 1, wherein component (2) the monofunctional alcohol has a molecular weight of about 128 to about 720, and an OH number of about 78 to about 438.

11. The plasticizer of claim 1, wherein (1)(a) said diisocyanate comprises an asymmetrical diisocyanate.

12. The plasticizer of claim 11, wherein said asymmetrical diisocyanate is selected from the group consisting of 2,4'-diphenylmethane diisocyanate, toluene diisocyanate, isophorone diisocyanate, and mixtures thereof.

13. The plasticizer of claim 1, wherein the plasticizer has a carbon to oxygen ratio of less than 5:1.

14. The plasticizer of claim 1 which is characterized by a viscosity of less than 30,000 mPa·s at 25° C.

15. The plasticizer of claim 1, wherein (1) said isocyanate prepolymer has an NCO group content of about 3 to about 10% by weight.

16. A process for the preparation of a high molecular weight, liquid, non-migrating, non-functional polyether polyurethane plasticizer having a viscosity of less than about 50,000 mPa·s at 25° C., comprising (1) reacting
  (a) a diisocyanate component having an NCO group content of about 32.0 to about 60.0%, and a functionality of about 2.0, with
  (b) at least one polyether polyol having a molecular weight of about 1,000 to less than about 5,000, an OH number of about 23 to about 168 and a functionality of from about 2 to about 3,
  wherein component (1)(a) and component (1)(b) are present in amounts such that the NCO:OH equivalent ratio is from about 2:1 to about 7:1 to form an isocyanate-terminated polyether prepolymer having an NCO group content of less than about 13%; and
(2) reacting the isocyanate-terminated polyether prepolymer formed in (1) above with
  (c) a monofunctional alcohol having a molecular weight of about 32 to about 1,000, and an OH number of about 56 to about 1750.

17. The process of claim 16, wherein (1)(a) said diisocyanate comprises diphenylmethane diisocyanate.

18. The process of claim 17, wherein (1)(a) said diphenylmethane diisocyanate has an isomer distribution of at least about 20% by weight of the 2,4'-isomer; less than about 80% by weight of the 4,4'-isomer; and about 5% by weight or less of the 2,2'-isomer.

19. The process of claim 18, wherein said diphenylmethane diisocyanate has an isomer distribution of about 40 to about 70% by weight of the 2,4'-isomer, about 30 to about 60% by weight of the 4,4'-isomer, and about 2% by weight or less of the 2,2'-isomer.

20. The process of claim 19, wherein said diphenylmethane diisocyanate has an isomer distribution of about 50 to about 60% by weight of the 2,4'-isomer, about 40 to about 50% by weight of the 4,4'-isomer, and about 0% by weight of the 2,2'-isomer.

21. The process of claim 16, wherein (1)(a) said diisocyanate component has an NCO group content of about 32.0 to 50.0% by weight and a viscosity of less than about 1,000 mPa·s at 25° C.

22. The process of claim 16, wherein (1)(b) said polyether polyol has a molecular weight of about 2,000 to about 4,000, an OH number of about 56 to about 112, and a functionality of about 2.

23. The process of claim 22, wherein (1)(b) said polyether polyol has a molecular weight of about 3,000 to about 4,000.

24. The process of claim 16, wherein components (1)(a) said diisocyanate and (1)(b) said polyether polyol are present in amounts such that the NCO:OH equivalent ratio is from about 3:1 to about 5:1.

25. The process of claim 16, wherein component (2) the monofunctional alcohol has a molecular weight of about 128 to about 720, and an OH number of about 78 to about 438.

26. The process of claim 16, wherein (1)(a) said diisocyanate comprises an asymmetrical diisocyanate.

27. The process of claim 26, wherein said asymmetrical diisocyanate is selected from the group consisting of 2,4'-diphenylmethane diisocyanate, toluene diisocyanate, isophorone diisocyanate, and mixtures thereof.

28. The process of claim 16, wherein the plasticizer has a carbon to oxygen ratio of less than 5:1.

29. The process of claim 16 which is characterized by a viscosity of less than 30,000 mPa·s at 25° C.

30. The process of claim 16, wherein (1) said isocyanate prepolymer has an NCO group content of about 3 to about 10% by weight.

31. A process for the production of a polyurethane elastomer comprising reacting (A) a polyisocyanate component with (B) an isocyanate-reactive component in the presence of (C) the high molecular weight, liquid, non-migrating, non-functional polyether polyurethane plasticizer of claim 1.

32. The process of claim 31, wherein (B) said isocyanate-reactive component comprises (i) one or more high molecular weight polyols and/or (ii) one or more low molecular weight chain extenders.

33. The process of claim 32, wherein (B)(i) said high molecular weight polyols have a functionality of from about 1 to about 4 and a molecular weight of about 500 to about 10,000; and (B)(ii) said low molecular weight chain extenders have a functionality of about 1 to about 4 and a molecular weight of about 60 to less than about 500.

34. The process of claim 32, wherein (B)(i) said high molecular weight polyols have a functionality of about 2 to about 3 and a molecular weight of about 1,000 to about 8,000.

35. The process of claim 32, wherein (B)(i) said high molecular weight polyols are selected from the group consisting of polyether polyols and polyester polyols.

36. The polyurethane elastomer produced by the process of claim 31.

37. A polyurethane elastomer produced by reacting a polyisocyanate component with an isocyanate-reactive component in the presence of the plasticizer of claim 1, wherein the plasticizer is present in an amount of less than 50% by weight, based on the total weight of the polyurethane elastomer.

* * * * *